US006864417B2

(12) United States Patent
Bechis et al.

(10) Patent No.: US 6,864,417 B2
(45) Date of Patent: Mar. 8, 2005

(54) SYSTEM FOR TRANSMITTING ELECTRIC ENERGY IN SUPERCONDUCTIVITY CONDITIONS AND METHOD FOR REFRIGERATING IN A CONTINUOUS SUPERCONDUCTING CABLE

(75) Inventors: Massimo Bechis, Dusino San Michele (IT); Marco Nassi, Turin (IT)

(73) Assignee: Pirelli Cavi E Sistemi S.p.A., Milan (IT)

( * ) Notice: Subject to any disclaimer, the term of this patent is extended or adjusted under 35 U.S.C. 154(b) by 107 days.

(21) Appl. No.: 10/056,021

(22) Filed: Jan. 28, 2002

(65) Prior Publication Data

US 2002/0134533 A1 Sep. 26, 2002

Related U.S. Application Data

(63) Continuation of application No. PCT/EP00/06877, filed on Jul. 19, 2000.
(60) Provisional application No. 60/145,838, filed on Jul. 27, 1999.

(30) Foreign Application Priority Data

Jul. 26, 1999 (EP) .............................. 99114604

(51) Int. Cl.$^7$ .............................. H01B 7/34; H01B 12/00
(52) U.S. Cl. ..................................... 174/15.1; 174/15.4
(58) Field of Search .............................. 174/15.1, 15.2, 174/15.4, 16.1, 125.1; 62/6

(56) References Cited

U.S. PATENT DOCUMENTS

| | | | | |
|---|---|---|---|---|
| 3,646,243 A | * | 2/1972 | Graneau et al. ........... 174/15.5 |
| 3,878,691 A | * | 4/1975 | Asztalos ....................... 62/467 |
| 3,882,687 A | * | 5/1975 | Asztalos et al. ............. 62/50.5 |
| 3,932,158 A | * | 1/1976 | Hildebrandt .................. 62/500 |
| 4,947,007 A | * | 8/1990 | Dew et al. ................. 174/15.5 |
| 5,111,665 A | | 5/1992 | Ackermann |
| 5,521,264 A | * | 5/1996 | Mehra et al. ................. 526/68 |
| 5,859,386 A | * | 1/1999 | Herrmann et al. ......... 174/15.5 |
| 6,354,087 B1 | * | 3/2002 | Nakahara et al. ................ 62/6 |
| 6,448,501 B1 | * | 9/2002 | McIntyre et al. ......... 174/125.1 |
| 2002/0035039 A1 | * | 3/2002 | Nassi et al. .................. 505/100 |
| 2002/0038719 A1 | * | 4/2002 | Nassi et al. .............. 174/125.1 |
| 2003/0010527 A1 | * | 1/2003 | Metra et al. ............. 174/125.1 |

FOREIGN PATENT DOCUMENTS

| | | | | |
|---|---|---|---|---|
| FR | 1546758 | | 11/1968 | |
| JP | 10223066 A | * | 8/1998 | ........... H01B/12/16 |
| JP | 11-83248 A | * | 3/1999 | ........... C23F/13/00 |
| SD | SU 1041830 A | * | 3/1982 | ........... F25B/11/00 |

* cited by examiner

Primary Examiner—William H. Mayo, III
(74) Attorney, Agent, or Firm—Finnegan, Henderson, Farabow, Garrett & Dunner, L.L.P.

(57) ABSTRACT

A system (100) for transporting electric energy in superconductivity conditions includes a superconducting cable (13) including superconducting material, and a cryogenic plant (1) for cooling said superconducting cable (13) below the critical temperature of the material, comprising: a) a circuit (2) for circulating a first refrigerating fluid having a first predetermined temperature lower than the critical temperature of the superconducting material, from and to the superconducting cable (13); b) a refrigerating circuit (3) for cooling a second refrigerating fluid to a second predetermined temperature lower than the temperature of the first refrigerating fluid; c) a heat exchange unit (31) for effecting a heat exchange between the first and second refrigerating fluids, which is characterized in that the heat exchange unit (31) is provided with a storage unit (4) of a third refrigerating fluid having a third predetermined temperature lower than the temperature of the first refrigerating fluid and being in heat exchange relationship with the first and second fluids.

19 Claims, 5 Drawing Sheets

SYSTEM FOR TRANSMITTING ELECTRIC ENERGY IN SUPERCONDUCTIVITY CONDITIONS AND METHOD FOR REFRIGERATING IN A CONTINUOUS SUPERCONDUCTING CABLE

CROSS REFERENCE TO RELATED APPLICATIONS

This application is a continuation of international application number PCT/EP00/06877, filed Jul. 19, 2000, the content of which is incorporated herein by reference, and claims the priority of Europe an Patent Application No. 99114604.4, filed Jul. 26, 1999, and the benefit of U.S. Provisional Application No. 60/145,838, filed Jul. 27, 1999, the content of which is incorporated herein by reference.

FIELD OF THE INVENTION

In a first aspect thereof, the present invention relates to a system for transporting electric energy in the so-called superconductivity conditions, that is, when the electric resistance is lower than $10^{-8}$ $\Omega$/m.

In particular, the present invention relates to a system for transporting electric energy in superconductivity conditions comprising a superconducting cable including superconducting material, and a cryogenic plant for cooling in continuous the superconducting cable below the critical temperature of said material.

In a second aspect thereof, the present invention relates to a cryogenic plant for cooling in continuous a superconducting cable.

In a further aspect, the present invention also relates to a method for cooling in continuous a superconducting cable.

In the following description and in the appended claims, the term "superconducting cable" is used to indicate a cable adapted to transport electric current and comprising at least one conductor including a layer of superconducting material.

In the following description and in the appended claims, the term "superconducting material" is used to indicate a material, such as for instance ceramics based on mixed oxides of copper, barium, yttrium or bismuth, lead, strontium, calcium, copper, thallium and mercury, comprising a superconducting phase having an electrical resistance lower than $10^{-8}$ $\Omega$/m below a given temperature, defined as critical temperature (hereinafter also shortly referred to as Tc).

PRIOR ART

In the field of transport of high quantities of electric current by means of superconducting cables, the need is especially felt of ensuring that the superconducting cable is properly cooled during its operation so as to maintain the superconducting material below its critical temperature, thus ensuring a high capacity of transporting electric current in superconductivity conditions.

In particular, it should be ensured that the superconducting material of the cable never exceeds its Tc even in the case of failure of the cooling unit or in the case of maintenance work on the same.

In fact, if the superconducting material operates at a temperature exceeding its critical temperature, it would loose its superconductive properties and would function as a normal conductor with a drastic fall of the electric current actually transported and/or with a significant increase in losses and/or with permanent damage to the cable itself.

The superconducting materials currently used are characterized by critical temperature values of about 110K; however, owing to technological constraints basically related to the degradation of the properties of electrical current transport of the superconducting material when approaching the critical temperature, the maximum temperature at which said materials are used is usually limited to about 85K.

In order to meet the aforementioned need of ensuring a proper cooling of the cable, the prior art suggests to adopt the redundancy criterium for the cryogenic units.

In fact, as described in U.S. Pat. No. 5,111,665, in order to cool in continuous a superconducting magnet also in the case of malfunctions of the cryogenic system used, it has been proposed that at least two cryogenic units be employed.

In particular, during normal operating conditions, only one cryogenic unit is in contact with the superconducting magnet so as to cool the same, whereas the other unit or units are kept in stand-by; in case of malfunction of the cryogenic unit in contact with the magnet, one of the cryogenic units in stand-by is connected to the magnet so as to disconnect the malfunctioning unit and provide for its repair or replacement.

The Applicant, however, has observed that this solution involves very high investment and operating costs, so that the use of superconducting cables for the transport of high quantities of electric current is scarcely competitive with respect to conventional copper cables.

SUMMARY OF THE INVENTION

The Applicant has observed that a cryogenic system of the type described in U.S. Pat. No. 5,111,665 comprising at least two cryogenic units of which only one is active during normal operating conditions, may not be operative at the moment of commutation of the cryogenic units owing to the intrinsic complexity of the system itself. Additionally, the cryogenic unit or units activated when the first active unit malfunctions may require quite long periods to reach the same refrigerating conditions imposed by the first active unit.

The Applicant has realized that the problem to solve was not that of ensuring an indefinite operation of the cryogenic system, but rather, that of ensuring an autonomy of operation of the cryogenic system for a limited time so as to repair possible failures or carry out ordinary or extraordinary maintenance on its components.

According to a first aspect thereof, the present invention relates to a system for transporting electric energy in superconductivity conditions, comprising a superconducting cable including superconducting material and a cryogenic plant for cooling in continuous the superconducting cable below the critical temperature of said material, comprising:

a) a circuit for circulating from and to the superconducting cable a first refrigerating fluid having a first predetermined temperature lower than the critical temperature of the superconducting material, b) a refrigerating circuit for cooling a second refrigerating fluid to a second predetermined temperature lower than the temperature of the first refrigerating fluid, c) a heat exchange unit for effecting a heat exchange between said first and second refrigerating fluids, which is characterized in that the heat exchange unit comprises a storage unit of a third refrigerating fluid having a third predetermined temperature lower than the temperature of the first refrigerating fluid, the third refrigerating fluid being in heat exchange relationship with the first and second fluids.

According to a first embodiment of the invention, the refrigerating circuit for cooling the second refrigerating fluid comprises at least one refrigerating unit provided with at least one heat exchanger which is in heat exchange relationship with the storage unit.

Advantageously, the feature of providing the heat exchange unit with at least one storage unit of a third refrigerating fluid in heat exchange relationship on the one side with the first fluid, and on the other side, with the second fluid and having a temperature lower than the temperature of the first fluid, ensures that the superconducting material may be cooled below its Tc both during ordinary operation and during failures of the cooling unit, or during its maintenance, even without adopting redundancy. In fact, during normal operating conditions the third fluid stored inside the storage unit of the heat exchange unit, having a temperature which is intermediate between the temperatures of the first and second fluids, is capable to absorb the heat taken up by the first fluid during its flow through the superconducting cable and to deliver this heat to the second fluid constantly cooled in turn by the refrigerating circuit.

In other words, during normal operating conditions of the cryogenic system, the third fluid stored in the storage unit of the heat exchange unit carries out the function of heat transport fluid from the first fluid which cools the superconducting cable directly to the second fluid.

During abnormal operating conditions, that is, during failure or during maintenance of the refrigerating unit, the third fluid stored in the storage unit of the heat exchange unit temporarily functions as "thermal sink", that is, as a cold source for the first fluid, thus ensuring its cooling so as to maintain the superconducting material below its Tc. Said temporary function of "thermal sink" is performed in practice by exploiting the latent heat of evaporation withdrawn from the third fluid accumulated by evaporating a predetermined portion thereof as a consequence of the heat supplied to the same by the first refrigerating fluid.

For the purposes of the invention, the storage unit has a predetermined volume adapted to contain a quantity of the third refrigerating fluid corresponding to the thermal consumption of the superconducting cable for at least two hours in the absence of a heat exchange with the second refrigerating fluid.

In one embodiment of the invention, the storage unit is defined within the refrigerating unit.

In an alternative embodiment, the storage unit comprises a storage tank structurally independent from the refrigerating unit.

In both cases, the fluid stored inside the storage unit functions as heat transport fluid from the first fluid to the second one during normal operating conditions, and as "thermal sink" for the first fluid under abnormal operating conditions, as described above.

Advantageously, the heat exchange unit further includes at least one heat exchanger, preferably of the finned-tube type, immersed in the third refrigerating fluid stored in the storage unit, said at least one heat exchanger being provided with a fluid flowpath for the tube-side circulation of the first refrigerating fluid.

In particular, thanks to the presence of fins, a wide heat exchange surface is provided inside the storage unit between the third and the first refrigerating fluids.

Advantageously, the heat exchange unit includes a plurality of finned-tube heat exchangers immersed in the third refrigerating fluid and adapted to effect a heat exchange between the first and third fluids on the one side, and between the second and third fluids on the other side. Preferably, at least one of said heat exchangers is provided with a fluid flowpath for the tube-side circulation of the first fluid, and at least one of said heat exchangers is provided with a fluid flowpath for the tube-side circulation of the second refrigerating fluid.

For the purpose of keeping the temperature of the third fluid stored in the storage unit constant, the system of the invention is preferably provided with an auxiliary circuit, which is operated in case of abnormal operation and which is adapted to lower the pressure within the storage unit and maintain the same at the liquid-vapor equilibrium value corresponding to the third predetermined temperature of the third refrigerating fluid by extracting in continuous a gas phase constituted by vapors of the third fluid formed in the storage unit.

Preferably, said auxiliary circuit comprises at least one vacuum pump connected to the storage unit by means of ducts with the interposition of at least one heat exchange unit. Said vacuum pump is operated by a control unit of the system in case of abnormal operation, and it advantageously allows to extract the gas phase formed by partial evaporation of the third fluid from the storage unit, so as to maintain the temperature of the latter constant.

Advantageously, the heat exchange unit includes at least one, preferably two heat exchangers, preferably of the finned-tube type, each provided with a fluid flowpath for the tube-side circulation of a gas phase including vapors of the third refrigerating fluid.

In this way, the presence of fins on the external surface of the tubes provides a wider heat exchange surface between the gas phase including the cold vapors of the third fluid withdrawn from the storage unit, and air used as heating means to bring the gas phase of the third fluid to a temperature nearing ambient temperature, compatible with the operation of the vacuum pump or pumps.

Furthermore, the presence of two parallel heat exchangers allows to achieve an effective removal of the gas phase of the third fluid from the storage unit even if one of the two exchangers should be regenerated owing to an excessive formation of ice due to solidification of air humidity on the tube fins.

For the purpose of keeping the superconducting material below its Tc for a suitable time period capable to allow the repair of the failure or the maintenance, the system of the invention preferably comprises a storage container for the third refrigerating fluid, which is selectively connected by ducts to the storage unit of the heat exchange unit. Said storage container allows the transfer of the aforementioned third fluid towards the storage unit so as to compensate losses of the third fluid due to evaporation.

According to an alternative embodiment of the invention, the refrigerating circuit for cooling the second refrigerating fluid comprises at least one refrigerating unit in heat exchange relationship with the storage unit and with the first fluid, located upstream of the superconducting cable, the storage unit being in parallel with the refrigerating unit.

In this way, during normal operating conditions the first fluid is cooled below its Tc by heat exchange with the second fluid inside a heat exchanger of the refrigerating unit.

In case of malfunction or maintenance of the refrigerating unit, the first refrigerating fluid is circulated inside the storage unit by operating a by-pass system, which prevents access to the refrigerating unit. Thus, the first fluid is cooled by the third fluid stored in the storage unit which, similarly to what happens in the first embodiment of the invention described hereinabove, temporarily functions as "thermal sink".

Preferably, the second refrigerating fluid is in heat exchange relationship with the storage unit itself, so as to subcool the third fluid to a predetermined temperature. Preferably, the heat exchange unit comprises at least one heat exchanger immersed in the third fluid stored in the storage unit and provided with a tube-side flowpath for circulating the second refrigerating fluid.

Preferably, the storage unit comprises a storage tank structurally independent from the refrigerating unit.

Preferably, liquid nitrogen is used as first refrigerating fluid and is cooled inside the storage tank to a temperature ranging between about 63 and about 70K, preferably at a temperature between 64 and 68K.

In particular, the lower limit for the operating temperature of nitrogen is not lower than the triple point temperature of nitrogen itself, below which the liquid phase is not present at any pressure. In the case of liquid nitrogen, said temperature value is equal to 63.2K.

Preferably, the second refrigerating fluid is gaseous helium having a pressure ranging between 1 and 20 bar and having a predetermined temperature set at the outlet from the heat exchange unit, ranging between 40 and 55K, preferably equal to 50K.

Preferably, the third refrigerating fluid is subcooled liquid nitrogen kept at a predetermined temperature ranging between 63 and 69K, preferably ranging between 64 and 67K.

According to a second aspect thereof, the present invention provides a cryogenic plant for cooling in continuous a superconducting cable, including at least one layer of superconducting material, below the critical temperature of said superconducting material, comprising:

a) a circuit for circulating a first refrigerating fluid having a first predetermined temperature from and to the superconducting cable, b) a refrigerating circuit for cooling a second refrigerating fluid to a second predetermined temperature lower than the temperature of the first refrigerating fluid, c) a heat exchange unit for effecting a heat exchange between the first and second refrigerating fluids, which is characterized in that said heat exchange unit is provided with a storage unit of a third refrigerating fluid having a third predetermined temperature lower than the temperature of the first refrigerating fluid, said third refrigerating fluid being in heat exchange relationship with said first and second fluids.

For the purposes of the invention, the storage unit has a predetermined volume adapted to contain a quantity of the third refrigerating fluid at the third predetermined temperature, corresponding to the thermal workload of the refrigerating circuit for a time period of at least two hours in the absence of heat exchange with the second fluid.

In this way, it is advantageously possible to maintain the superconducting material of the cable below its Tc even when the heat exchange between the first and second refrigerating fluids is not possible due, for example, to failure or to maintenance of one or more components of the refrigerating circuit.

Preferably, the storage unit has a volume corresponding to the thermal workload of the refrigerating circuit for a time period of at least twelve hours in the absence of heat exchange with the second fluid.

Preferably, the storage unit has a volume of at least 2000 liters, more preferably of at least 12000 liters.

In a further aspect thereof, the present invention provides a method for cooling in continuous a superconducting cable including superconducting material below the critical temperature of said material, comprising the following steps:

circulating a first refrigerating fluid from and to the superconducting cable, cooling the first refrigerating fluid to a first predetermined temperature by means of a second refrigerating fluid having a second predetermined temperature lower than the temperature of the first refrigerating fluid, which is characterized in that the cooling step of the first refrigerating fluid is carried out by means of the further steps of:

providing a cryogenic bath of a third refrigerating fluid in a storage area, cooling the third refrigerating fluid to a third predetermined temperature lower than the temperature of the first refrigerating fluid by means of said second fluid, cooling the first refrigerating fluid by means of the third refrigerating fluid stored in the cryogenic bath.

BRIEF DESCRIPTION OF THE DRAWINGS

Further features and advantages of the present invention will be more readily apparent from the following detailed description of some preferred embodiments of the system for the transport of electric energy of the present invention, made with reference to the attached drawings. In such drawings.

DETAILED DESCRIPTION OF PREFERRED EMBODIMENTS

Figure 1:
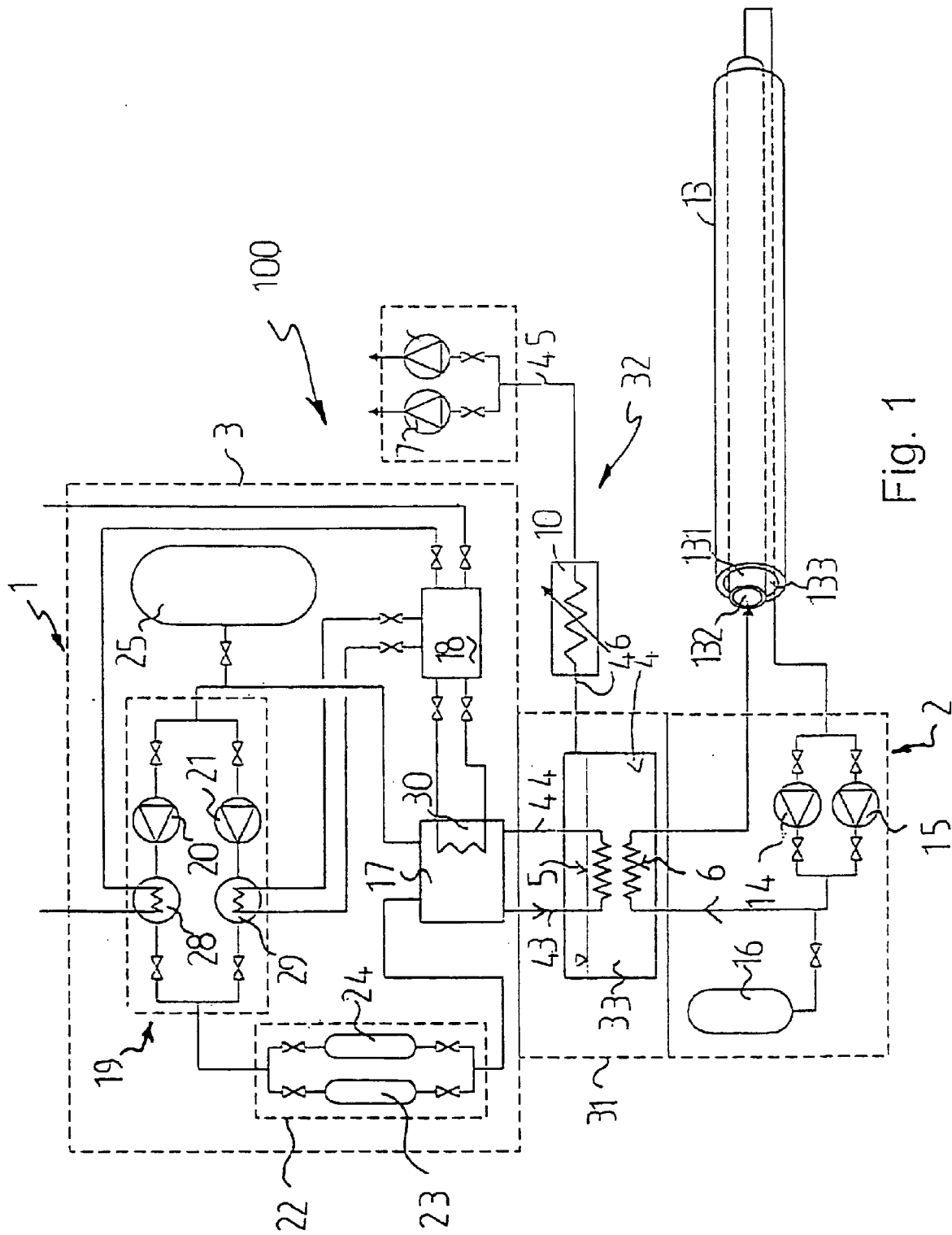
FIG. 1 shows a flow diagram of a first embodiment of the system according to the invention.

With reference to FIG. 1, a system for transporting electric energy according to a first embodiment of the invention is generally indicated at 100. The system 100 comprises a superconducting cable 13, conventional per se, and a cryogenic plant according to the invention, generally indicated at 1.

The superconducting cable 13 includes a conductor element 131, schematically shown in the figure, which comprises at least one layer of superconducting material (not detailed in the figure), and which is provided with longitudinal channels 132, 133 for circulating a refrigerating fluid, typically defined both inside and outside of said conductor elements, for example in the gap between said elements and a tubular containing sheath.

The cryogenic plant 1 comprises a circuit 2 for circulating from and to the superconducting cable 13 a first refrigerating fluid, such as liquid nitrogen having temperature and pressure of about 70K and, respectively, of 20 bar at the cable inlet, and of about 80K and 10 bar at the cable outlet.

The circuit 2 comprises two cryogenic pumps 14 and 15 adapted to promote the circulation of liquid nitrogen from and to the superconducting cable 13, a pressurizer 16, conventional per se, for adjusting the operating pressure of the refrigerating fluid of the superconducting cable 13, and ducts and valves conventional in themselves. The pressurizer 16 preferably comprises a heat exchanger, not shown in the figure, for adjusting the nitrogen pressure.

The cryogenic plant 1 also comprises a refrigerating circuit, generally indicated at 3, for cooling a suitable second refrigerating fluid, such as gaseous helium, from ambient temperature to a temperature of 50K and a pressure of 20 bar.

The refrigerating circuit 3 comprises a compression unit 19, a filtering unit 22 for removing any impurities present in the helium after the compression step, a refrigerating unit 17 wherein gaseous helium is cooled to the operating temperature of 50K, and finally, a cooling unit 18, such as a water-operated unit conventional per se, by means of which the heat generated in the refrigerating unit 17 and the heat generated in the compression unit 19 by compressing helium is removed.

The compression unit 19 comprises two compressors 20 and 21, for example screw-type compressors, in parallel with each other, having the function of compressing the gaseous helium returning from the refrigerating unit 17 up to the aforementioned helium operating pressure of 20 bar, and two gas-water heat exchangers 28, 29 for removing the heat produced during the compression step. Preferably, the heat exchangers 28 and 29 are provided with respective flow-paths for cooling water coming from the cooling unit 18, with which they are connected by means of suitable ducts.

The unit 22 for removing possible impurities present in the gaseous helium comprises two series of active-carbon filters 23 and 24, placed in parallel with each other.

In a way known per se, the refrigerating unit 17 comprises a plurality of conventional turbines, and a plurality of heat exchangers, typically conventional plate-and-frame heat exchangers, adapted to cool gaseous helium coming from the compression unit 19 to the operating temperature of 50K, as will be better detailed below.

The work produced by the turbines of the refrigerating unit 17 is converted into heat, and removed by means of one or more gas-water heat exchangers 30, schematically shown in the figure, connected to the cooling unit 18 by means of suitable ducts, as will be better detailed below.

For the purpose of compensating possible process losses, the refrigerating circuit 3 further comprises a tank 25 for storing gaseous helium.

In order to cool liquid nitrogen to the above-mentioned temperature of 70K, the cryogenic plant 1 comprises a heat exchange unit, generally indicated at 31, for effecting a heat exchange between the liquid nitrogen which cools the superconducting cable 13 and the gaseous helium.

The heat exchange unit 31 comprises a storage unit 4 of a third suitable refrigerating fluid, for example liquid nitrogen having a temperature of 65K, located upstream of the superconducting cable 13.

The storage unit 4 comprises a storage tank 33, which is connected by ducts 43 and 44 to the refrigerating unit 17. The tank 33 comprises two heat exchangers 5, 6, conveniently of the finned-tube type, immersed in a cryogenic bath of liquid nitrogen subcooled to 65K, and respectively crossed by gaseous helium coming from the refrigerating unit 17 and by liquid nitrogen circulating in the superconducting cable 13.

The system 100 further includes an auxiliary circuit 32 adapted to maintain the subcooled liquid nitrogen of the storage unit 4 at its operating temperature even in case of stop, due to maintenance or failure of the refrigerating unit 17 or other components of the refrigerating circuit 3.

The auxiliary circuit 32 comprises two conventional vacuum pumps 7 and 8 connected by ducts 45 and 46 to the storage unit 4, by interposition of a heat exchange unit 10, comprising for example two finned-tube heat exchangers placed in parallel with each other. Said vacuum pumps 7 and 8 are controlled by a conventional control panel, not shown in the drawings, by means of which the pumps 7 and 8 are operated to maintain the vacuum degree in the storage unit 4 at a value corresponding to the selected temperature even if the refrigerating unit 17 is not in operation.

With reference to the aforementioned embodiment of the system, it will now be described an embodiment of the method of the present invention.

In a first step, said method provides for the step of circulating liquid nitrogen from and to the superconducting cable 13 as first refrigerating fluid in order to maintain the superconducting material inside the cable below its critical temperature Tc.

In order to cool said liquid nitrogen to the temperature of 70K, lower than the critical temperature of the superconducting material, the aforementioned method provides for the use of gaseous helium coming from the refrigerating circuit 3 at a pressure of 20 bar and at a temperature of 50K.

In the given example of the present invention, the steps of cooling and compressing gaseous helium within the refrigerating circuit 3 are carried out by continuously circulating helium in a closed circuit through the compression unit 19, the impurity removal unit 22, the refrigerating unit 17, the heat exchanger 5 and, again, the refrigerating unit 17 so as to go back to the compression unit 19 to start a new cycle.

In particular, the cooling step of liquid nitrogen coming out of the superconducting cable 13 at a temperature of about 80K is effected by providing a cryogenic bath of subcooled liquid nitrogen having a temperature of 65K, in the storage tank 33 where the subcooled liquid nitrogen is simultaneously in heat exchange relationship with gaseous helium and liquid nitrogen circulating in said cable thanks to the heat exchangers 5 and 6 respectively.

In this way, the cooling step of liquid nitrogen circulating in the superconducting cable 13 from 80 to 70K is directly effected by the liquid nitrogen of the cryogenic bath, which functions as a heat transport fluid from the liquid nitrogen used for cooling the superconducting cable 13 to the gaseous helium coming from the refrigerating unit 17, adapted to function as "thermal sink". Once heat has been transferred to the gaseous helium inside the heat exchanger 5, the liquid nitrogen of the cryogenic bath is in turn cooled and kept at the temperature of 65K.

At the outlet of the heat exchanger 6, the liquid nitrogen cooled at the temperature of 70K is fed again to the superconducting cable 13.

The cryogenic plant 1 and the method of the invention allow to effectively cool the liquid nitrogen both during the normal operating conditions described above, and in case of failure or maintenance works.

This is possible thanks to the fact that the tank 33 of the storage unit 4 has a size suitable to ensure a sufficient autonomy of operation to the system 100 should the refrigerating circuit 3 not be available.

In particular, the size of the tank 33 is chosen so as to contain liquid nitrogen in such a quantity as to keep the system 100 in operation for a time period sufficient to repair possible damages, or to carry out maintenance work on the refrigerating circuit 3, or to allow supplying further liquid nitrogen to the tank 33. For example, the volume of the tank 33 may vary between 2000 l and 20000 l so as to maintain the system in operation for a time period of from 2 to 24 hours.

In these cases, the heat absorbed by the liquid nitrogen used for cooling the superconducting cable 13 is transferred to the liquid nitrogen of the storage tank 33.

However, since the latter cannot transfer said heat to the gaseous helium due to a halt of the system, it would tend to progressively heat up, thus loosing its capacity as refrigerating fluid. Said heating is advantageously prevented by keeping the pressure within the storage tank 33 at a value corresponding to the liquid-vapor equilibrium value of nitrogen, at the expected temperature of 65K.

The aforementioned operating step is effected by starting up pumps 7 and 8, which provide for the extraction of the nitrogen in the gas phase generated within the storage tank 33 by the heat transferred from the liquid nitrogen used for cooling the cable 13.

In particular, said pumps 7 and 8 which remove nitrogen in gas phase, allow to maintain the pressure within the storage tank 33 at a value corresponding to the liquid-vapor equilibrium value at the temperature of 65K.

Before reaching the two pumps 7 and 8, and once it has been removed from the storage tank 33 the nitrogen in gaseous phase goes through the heat exchange unit 10, where it exchanges heat with air until it reaches a temperature compatible with the operation of the two pumps 7 and 8, which is usually close to ambient temperature.

By properly designing the size of the storage tank 33, it is advantageously possible to determine an autonomy of operation of this auxiliary refrigerating system sufficient to allow the desired intervention in safe conditions.

At the end of the maintenance or repair works required to repair the failure in the refrigerating unit 17, or in one of the other components of the refrigerating circuit 3, the cooling function of gaseous helium towards the liquid nitrogen in the storage tank 33 can be restored, so that the vacuum pumps 7 and 8 and the heat exchange unit 10 may return in stand-by.

Figure 2:
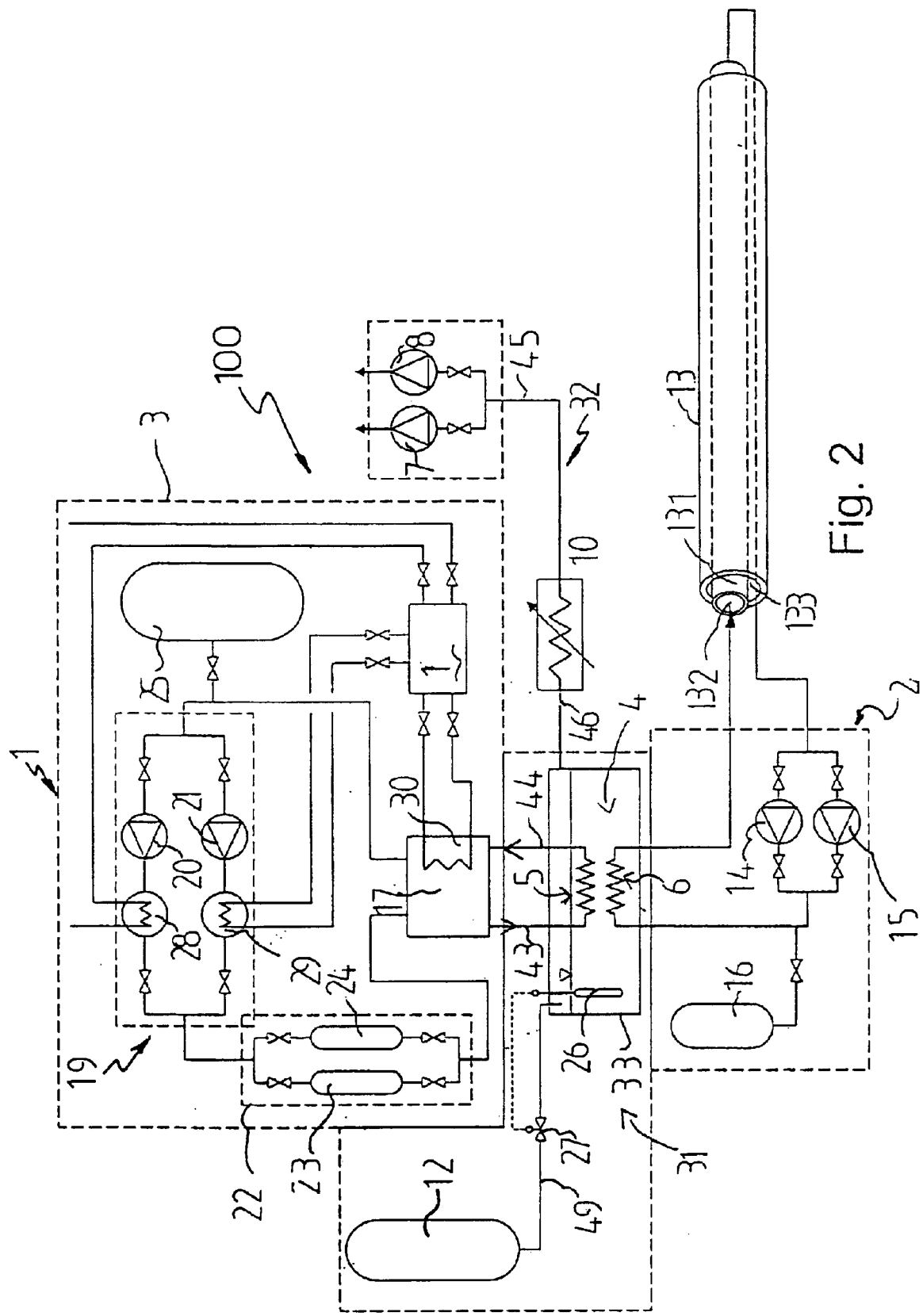
FIG. 2 shows a flow diagram of a different embodiment of the system of FIG. 1.

FIG. 2 shows another embodiment of the system illustrated in previous FIG. 1.

For the sake of clarity, in the present FIG. 2 and in the following figures the components of the system structurally or functionally equivalent to those previously described with reference to FIG. 1 will be referred to with the same reference numerals, and they will not be described further.

In the embodiment shown in FIG. 2, the storage tank 33 is selectively connected to a further storage container 12 of liquid nitrogen by means of a duct 49 and a valve 27. The container 12 has a size suitable to ensure a sufficient autonomy of operation to the system 100 should the refrigerating circuit 3 not be available.

To this end, the tank 33 is provided with a level meter 26 adapted to drive the valve 27 located on the connection line between the tank 33 and the storage container 12 and to control the opening of the valve 27 whenever the level of liquid nitrogen inside the tank 33 needs to be restored.

In particular, after the evaporation of an ever-increasing quantity of subcooled nitrogen from the cryogenic bath, the level of the bath in the storage tank 33 decreases until the level meter 26 opens the valve 27, thus allowing to withdraw new liquid nitrogen from the storage container 12, until the level of liquid in the storage tank 33 is restored, thereby enhancing the capacity of the same.

At the end of the maintenance works or of the repair work required, the system 100 starts operating again according to normal conditions and, if necessary, the quantity of liquid nitrogen in container 12 can be restored.

Figure 3:
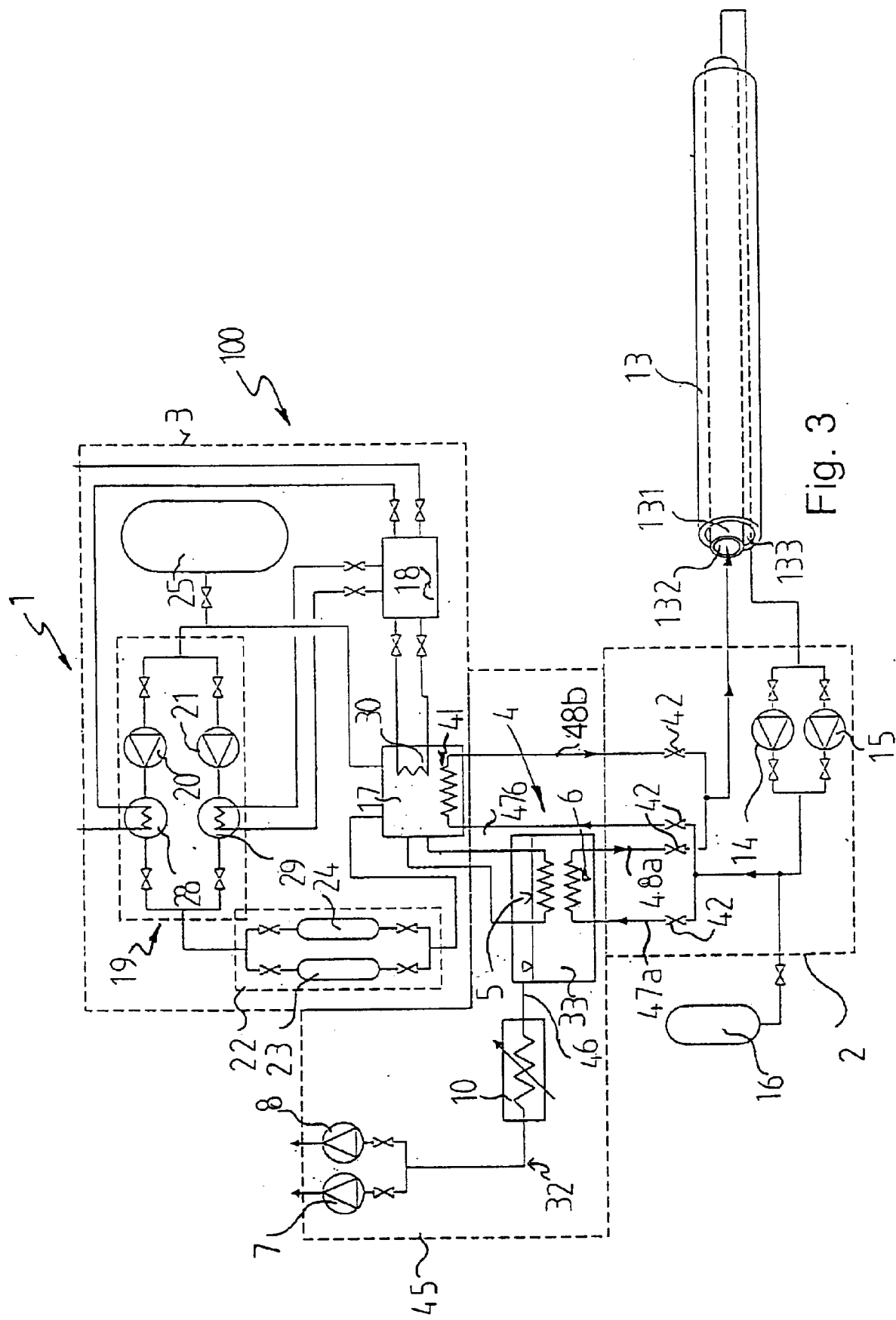
FIG. 3 shows a flow diagram of a further alternative embodiment of the system according to the invention.

FIG. 3 shows a further alternative of embodiment of the system according to the invention.

In this embodiment, the refrigerating unit 17 is connected in parallel to the storage unit 4 of the third refrigerating fluid by means of suitable ducts 47a–b and 48a–b and by means of respective valves 42, adapted to allow the first fluid to flow through either the heat exchanger 6 immersed in the third fluid stored in the storage unit 4, or a heat exchanger 41 located inside the refrigerating unit 17.

In particular, the heat exchanger 41 is preferably provided with a tube-side fluid flowpath for the circulation of the first fluid.

The storage unit 4 comprises a tank 33, structurally independent from the refrigerating unit 17, where a heat exchanger 5, conveniently of the finned-tube type, subcools the cryogenic bath by means of the second refrigerating fluid.

In this embodiment, the cooling step of liquid nitrogen which leaves the superconducting cable 13, having a temperature of about 80K, is effected by means of a heat exchange with the gaseous helium in the heat exchanger 41 located inside the refrigerating unit 17.

In case of halt or failure in the cryogenic plant 1, the liquid nitrogen used for cooling the superconducting cable 13 is directed, by opening the valves 42 which allow to by-pass the heat exchanger 41, into the heat exchanger 6 immersed in the storage tank 33, which has a suitable size capable to ensure a sufficient autonomy of operation of the system 100 should the refrigerating circuit 3 stop or fail.

In this way, the heat absorbed by the liquid nitrogen during its flow inside the superconducting cable 13 is transferred to the liquid nitrogen of the cryogenic bath contained in the tank 33, which ensures the autonomy of operation required.

During normal operation of the system of the invention, the fluid contained in the tank 33 is in turn kept at subcooled conditions by heat exchange with gaseous helium circulating inside the heat exchanger 5, although being independent of the primary refrigerating circuit of the nitrogen circulating in cable 13.

Similarly to what has been disclosed with reference to the embodiment of FIG. 1, in order to prevent the heating of nitrogen of the cryogenic bath during abnormal operating conditions, the pressure inside the storage tank 33 is decreased to the liquid-vapor equilibrium value of nitrogen corresponding to an expected temperature of 65K.

Figure 4:
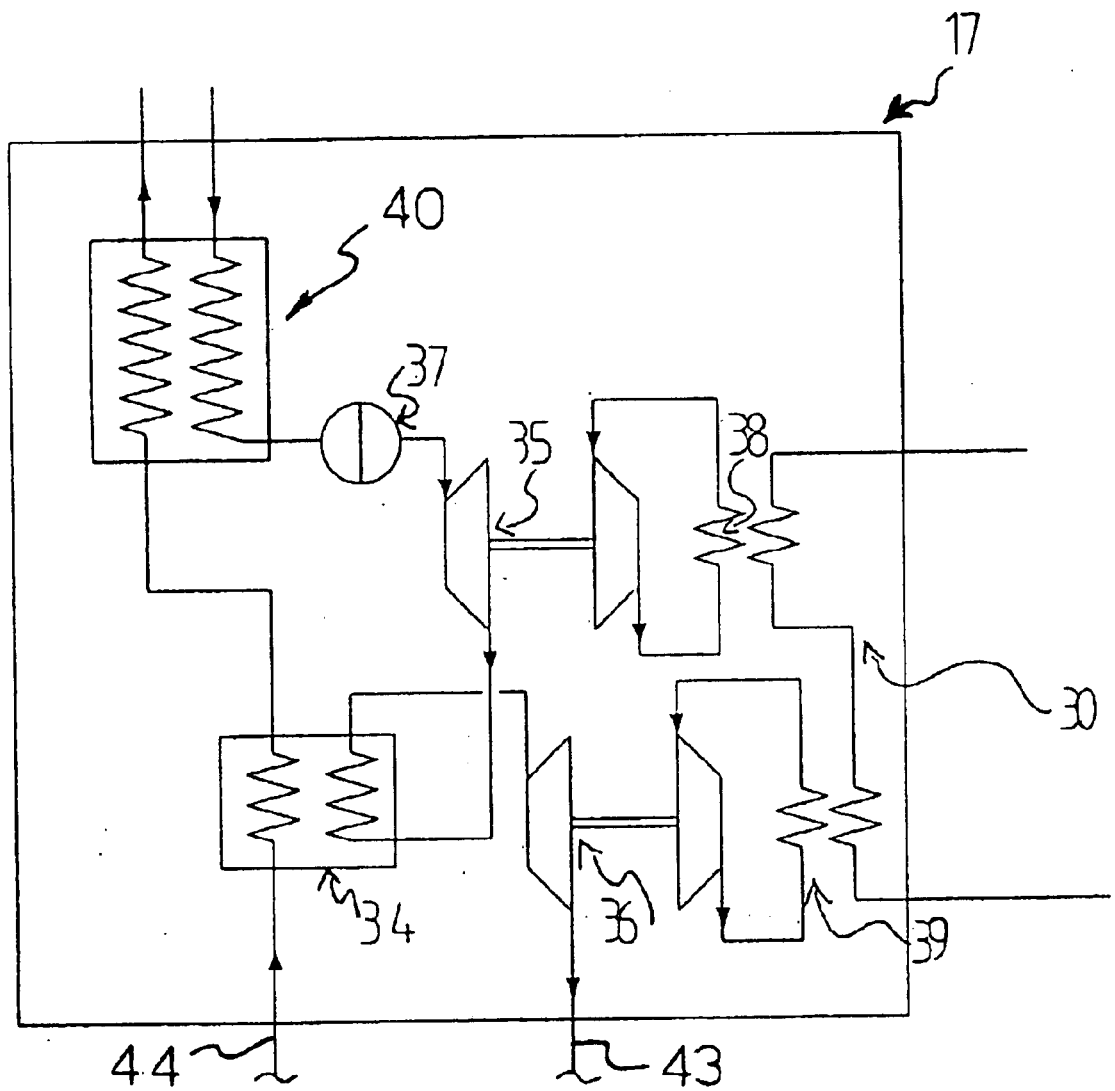
FIG. 4 schematically shows some details of a refrigerating unit of the system referred to in the previous figures.

FIG. 4 schematically shows an embodiment of the refrigerating unit 17.

The refrigerating unit 17 comprises two turbines 35 and 36, connected in series, adapted to expand high-pressure gaseous helium coming from the compression unit 19, thus obtaining a low-pressure gas fluid (about 5 bar) cooled at about 50K.

Said gaseous fluid comes out of the refrigerating unit 17 by flowing through the duct 43, and in turn cools the liquid nitrogen of the cryogenic bath of the storage area 4 by means of the heat exchanger 5. In its return towards the unit 19, the gaseous fluid flows through the duct 44 towards the refrigerating unit 17 where, by means of the heat exchanger 34, it partially cools down due to the current of gaseous helium leaving turbine 35. The gaseous fluid then partially cools the flow of high-pressure gaseous helium in heat exchanger 40. A filter 37, adapted to remove any possible impurities present in the high-pressure gas current before it is sent to the turbine, is conveniently provided upstream of the turbines 35 and 36.

The passive work produced by the turbines 35 and 36 of the refrigerating unit 17 is removed by means of the corresponding compressors 38 and 39 connected to said turbines, which compress a suitable thermal transfer fluid, such as gaseous helium, which is afterwards cooled by the gas-water heat exchangers 30.

With reference to the description given hereinabove, a numeric example is given below for illustrating in a non limitative way the operation of the cryogenic system of the invention under normal and abnormal operating conditions.

EXAMPLE 1

Invention

In order to evaluate the effectiveness of transport of electric energy in superconductivity conditions by means of the system of the invention shown in FIG. 1, the study of an electrical connection having a length of 2.8 Km effected by a superconducting cable of the FCT type (Flexible Cryostat, Cryogenic Dielectric, Three-Phase Element) has been carried out.

Figure 5:
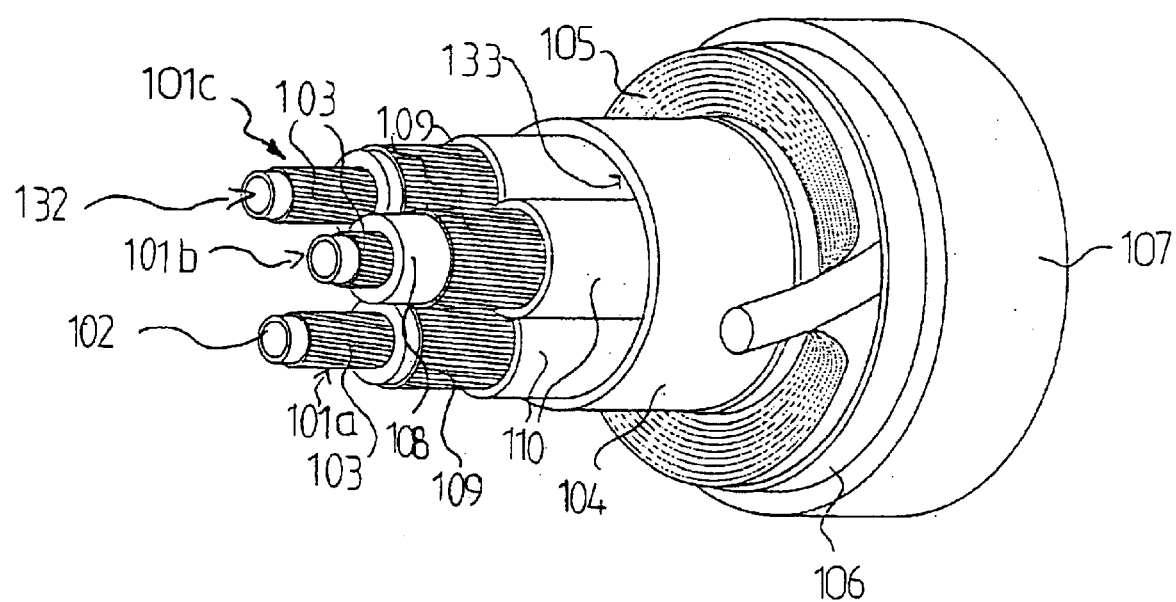
FIG. 5 is a perspective view of a three-phase superconducting cable.

The cable considered is schematically shown in FIG. 5, and comprises three conductor elements 101a, 101b, 101c, housed within a tube 104, typically made of metal and preferably corrugated, around which is a cryostat 105, sheathed in its turn by an external tube 106, typically made of metal, covered with a sheath 107.

Each of the conductor elements 101 comprises in turn a supporting tube 102 made of metal, plastic or composite material, typically having a spiral structure on which are placed the phase superconducting tapes 103. The superconducting tapes 103 are surrounded in turn by an insulating layer 108, around which is a second layer of neutral superconducting tapes 109, surrounded by a respective sheath 110.

In said structure, a flowpath 132 for delivering the cooling liquid nitrogen to the cable is defined inside each supporting tube 102, whereas a flowpath 133 for the return of liquid nitrogen is defined by the gaps around the conductor elements 101 within the tube 104.

The parameters used in the transmission of electric current inside the superconducting cable are as follows:

| Voltage | 225 kV |
|---|---|
| Power | 1000 MVA |
| Frequency | 50 Hz |

The refrigerating fluid used to maintain the superconducting material of the cable (BSSCO) below its Tc (equal to 107K) is liquid nitrogen maintained at a temperature ranging between 65 and 70K by heat exchange with other liquid nitrogen which is contained in a storage tank 33 and kept in its turn at a temperature ranging between 63 and 66K by means of gaseous helium coming from the refrigerating circuit 3 of the cryogenic plant 1 and having a temperature ranging between 50 and 60K.

In particular, the temperature values of 65K and 70K of the liquid nitrogen circulating in the cable are to be regarded as the temperatures taken by the fluid at the inlet and, respectively, at the outlet of the superconducting cable.

The cooling capacity (thermal power) required by the cryogenic plant 1 (basically required to compensate the losses due to thermal dispersion) proved to be equal to 40 kW.

During normal operating conditions, said thermal power is supplied by the refrigerating circuit 3. During conditions of failure or maintenance of the refrigerating circuit 3, and in particular of the refrigerating unit 17, said value of thermal power is provided by the storage tank 33 by evaporating part of the liquid nitrogen stored therein.

At a temperature of 64K, which is the temperature of nitrogen contained in the storage tank 33, the thermodynamic data gives a value of the latent heat of evaporation of nitrogen of 214 kJ/kg. Therefore, the removal of a 40-kW thermal power by the storage tank 33 in abnormal operating conditions causes a consumption of liquid nitrogen equal to about 680 kg/h owing to its evaporation.

In order to ensure an effective cooling of the superconducting cable even during abnormal operating conditions, it is necessary to have a quantity of liquid nitrogen at least equal to the quantity evaporated during abnormal operation.

Having a storage tank 33 with a capacity of 12000 l, and having assessed that at a temperature of 64K the cooling of the cable 13 entails a nitrogen consumption of 680 kg/h, which corresponds to about 840 l/hour, the system of the invention can maintain the superconducting material below its Tc, thus ensuring the transport of current in superconductivity conditions for a time period equal to about 14 hours.

This time period is usually compatible with the time currently required to repair a failure or for the ordinary maintenance of the refrigerating circuit 3, or with the time required to supply to the tank 33 or to the container 12, if present, other liquid nitrogen so as to prolong, if necessary, the time required for maintaining or repairing the refrigerating circuit 3.

What is claimed is:

1. A system for transporting electric energy in superconductivity conditions, comprising:

a superconducting cable including superconducting material, and a cryogenic plant for cooling said superconducting cable below the critical temperature of said material, comprising:

a) a circuit for circulating from and to the superconducting cable a first refrigerating fluid having a first predetermined temperature lower than the critical temperature of the superconducting material, b) a refrigerating circuit for cooling a second refrigerating fluid to a second predetermined temperature lower than the temperature of the first refrigerating fluid, and c) a heat exchange unit for effecting a heat exchange between said first and second refrigerating fluids, said heat exchange unit comprising a storage unit of a third refrigerating fluid having a third predetermined temperature lower than the temperature of the first refrigerating fluid, said third refrigerating fluid being in heat exchange relationship with said first and second fluids, and wherein said storage unit has a predetermined volume adapted to contain a quantity of said third refrigerating fluid at said predetermined temperature, corresponding to the thermal consumption of said superconducting cable for at least two hours in the absence of heat exchange with said second refrigerating fluid.

2. A system according to claim 1, wherein the refrigerating circuit for cooling the second refrigerating fluid comprises at least one refrigerating unit provided with at least one heat exchanger in heat exchange relationship with said storage unit.

3. A system according to claim 1, wherein the refrigerating circuit for cooling the second refrigerating fluid comprises at least one refrigerating unit in heat exchange relationship with the storage unit and with said first fluid, said refrigerating unit being positioned upstream of said superconducting cable and the storage unit being in parallel with said refrigerating unit.

4. A system according to claim 2 or 3, wherein said storage unit comprises a storage tank structurally independent from said refrigerating unit.

5. A system according to claim 4, further comprising a container for storing the third refrigerating fluid, said container being selectively connected to the storage unit of the heat exchange unit by means of at least one duct.

6. A system according to claim 1, wherein the heat exchange unit further includes at least one heat exchanger immersed in the third refrigerating fluid stored in said storage unit, said at least one heat exchanger being provided with a fluid flowpath for the tube-side circulation of said first refrigerating fluid.

7. A system according to claim 1, further comprising an auxiliary circuit for maintaining the third refrigerating fluid at said predetermined temperature.

8. A system according to claim 7, wherein the auxiliary circuit comprises at least one vacuum pump connected to said storage unit by means of ducts, at least one heat exchange unit being interposed between said vacuum pump and said heat exchange unit.

9. A system according to claim 8, wherein the heat exchange unit comprises at least one heat exchanger provided with a fluid flowpath for circulating a gas phase including vapors of said third refrigerating fluid.

10. A system according to claim 1, further comprising a container for storing the third refrigerating fluid, said container being selectively connected to the storage unit of the heat exchange unit by means of at least one duct.

11. A system according to claim 1, wherein the first refrigerating fluid is liquid nitrogen, and said first predetermined temperature is between 63° and 70° K.

12. A system according to claim 1, wherein said second refrigerating fluid is gaseous helium having a pressure ranging between 1 and 20 bar, and said second predetermined temperature is between 40° and 50° K.

13. A system according to claim 1, wherein said third refrigerating fluid is subcooled liquid nitrogen, and said third predetermined temperature is between 63° and 69° K.

14. A cryogenic plant for cooling a superconducting cable including a superconducting material below the critical temperature of said superconducting material, comprising:

a) a circuit for circulating a first refrigerating fluid having a first predetermined temperature from and to the superconducting cable, b) a refrigerating circuit for cooling a second refrigerating fluid to a second predetermined temperature lower than the temperature of the first refrigerating fluid, and c) a heat exchange unit for effecting a heat exchange between said first and second refrigerating fluids, said heat exchange unit being provided with a storage unit of a third refrigerating fluid having a third predetermined temperature lower than the temperature of the first refrigerating fluid, said third refrigerating fluid being in heat exchange relationship with said first and second fluids, and wherein said storage unit has a predetermined volume adapted to contain a quantity of said third refrigerating fluid at said predetermined temperature, corresponding to the thermal consumption of said superconducting cable for at least two hours in the absence of heat exchange with said second refrigerating fluid.

15. A cryogenic plant according to claim 14, wherein said storage unit has a volume corresponding to the thermal consumption of said superconducting cable for a time period of at least twelve hours in the absence of heat exchange with said second fluid.

16. A cryogenic plant according to claim 14, wherein said storage unit has a volume of at least 2000 liters.

17. A cryogenic plant according to claim 14, wherein said storage unit has a volume of at least 12000 liters.

18. A method for continuously cooling a superconducting cable including a superconducting material below the critical temperature of said superconducting material, comprising the steps of:

a) circulating a first refrigerating fluid from and to the superconducting cable;

b) cooling the first refrigerating fluid to a first predetermined temperature by means of a second refrigerating fluid having a second predetermined temperature lower than the temperature of the first refrigerating fluid;

the cooling step of the first refrigerating fluid being effected by means of the further steps of:

c) providing a cryogenic bath of a third refrigerating fluid in a storage area;

d) cooling the third refrigerating fluid to a third predetermined temperature lower than the temperature of the first refrigerating fluid by means of said second fluid; and e) cooling the first refrigerating fluid by means of the third refrigerating fluid stored in the cryogenic bath, wherein said cryogenic bath has a predetermined volume, adapted to contain a quantity of said third refrigerating fluid at said predetermined temperature, corresponding to the thermal consumption of said superconducting cable for at least two hours in the absence of heat exchange with said second refrigerating fluid.

19. A method according to claim 18, wherein the third refrigerating fluid is cooled to an intermediate temperature between the temperature of the first and second refrigerating fluids.

* * * * *